United States Patent
Bomash

(10) Patent No.: US 7,640,034 B2
(45) Date of Patent: Dec. 29, 2009

(54) SYSTEM, APPARATUS AND METHOD OF ESTIMATING QUALITY OF SIGNAL

(75) Inventor: Niv Bomash, Ramat-Yishai (IL)

(73) Assignee: Intel Corporation, Santa Clara ( * ) Notice: Subject to any disclaimer, the term of this patent is extended or adjusted under 35 U.S.C. 154(b) by 610 days.

(21) Appl. No.: 11/314,024

(22) Filed: Dec. 22, 2005

(65) Prior Publication Data

US 2007/0149234 A1 Jun. 28, 2007

(51) Int. Cl.
*H04B 7/00* (2006.01)
(52) U.S. Cl. .................... 455/522; 455/13.4; 455/63.1; 455/67.13
(58) Field of Classification Search ................ 455/522, 455/69, 414.3, 434, 67.1, 43, 67.4, 562.1, 455/456.1, 67.11, 67.13, 13.4, 504, 116, 455/115.1
See application file for complete search history.

(56) References Cited

U.S. PATENT DOCUMENTS

| | | | | |
|---|---|---|---|---|
| 5,325,403 | A * | 6/1994 | Siwiak et al. | 375/347 |
| 6,161,209 | A * | 12/2000 | Moher | 714/780 |
| 7,295,855 | B1 * | 11/2007 | Larsson et al. | 455/522 |
| 2002/0142788 | A1 * | 10/2002 | Chawla et al. | 455/504 |
| 2003/0036359 | A1 * | 2/2003 | Dent et al. | 455/63 |
| 2004/0127260 | A1 * | 7/2004 | Boros et al. | 455/562.1 |
| 2004/0166887 | A1 * | 8/2004 | Laroia et al. | 455/522 |
| 2004/0213195 | A1 * | 10/2004 | Islam et al. | 370/342 |
| 2005/0014523 | A1 * | 1/2005 | Pi et al. | 455/522 |
| 2005/0201484 | A1 * | 9/2005 | Wilhelmsson et al. | 375/286 |
| 2006/0067384 | A1 * | 3/2006 | Zhang et al. | 375/148 |
| 2007/0293203 | A1 * | 12/2007 | Usuda et al. | 455/414.3 |

OTHER PUBLICATIONS

3GPP TS 25.214 V5.9.0 (Jun. 2006), Section: 4.3.1.2, Downlink synchronisation primitives and Section: 6.4.4 Out-of-synchronization handling of output power.
TSG-RAN Working Group 4 (Radio) meeting #10, San Diego, California, USA Feb. 29-Mar. 3, 2000.

\* cited by examiner

*Primary Examiner*—Tan Trinh
(74) *Attorney, Agent, or Firm*—Pearl Cohen Zedek Latzer, LLP

(57) ABSTRACT

Briefly, an apparatus and a method of determining a quality indicator of a second received signal based on a characteristic of a first received signal. The apparatus is able to receive over a downlink channel of a wireless communication system a first signal having a predetermined bit sequence and second signals having an unknown bit sequence and to determine the quality indicator of the second received signal based on a characteristic of the first received signal.

26 Claims, 3 Drawing Sheets

SYSTEM, APPARATUS AND METHOD OF ESTIMATING QUALITY OF SIGNAL

BACKGROUND OF THE INVENTION

In some wireless communication systems such as, for example, cellular communication systems, a base station may transmit a power control (TPC) command to a mobile station. The mobile station may receive the TPC command and may increase or decrease a transmit power level based on the TPC command. The received TPC command may include noise, distortion, errors in bit sequence, and other types of interference which may reduce the quality of the received TPC.

Furthermore, poor quality of the received TPC command may cause the mobile station to transmit at a high power level. The high transmit power level may interfere with neighboring mobile stations and/or base stations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
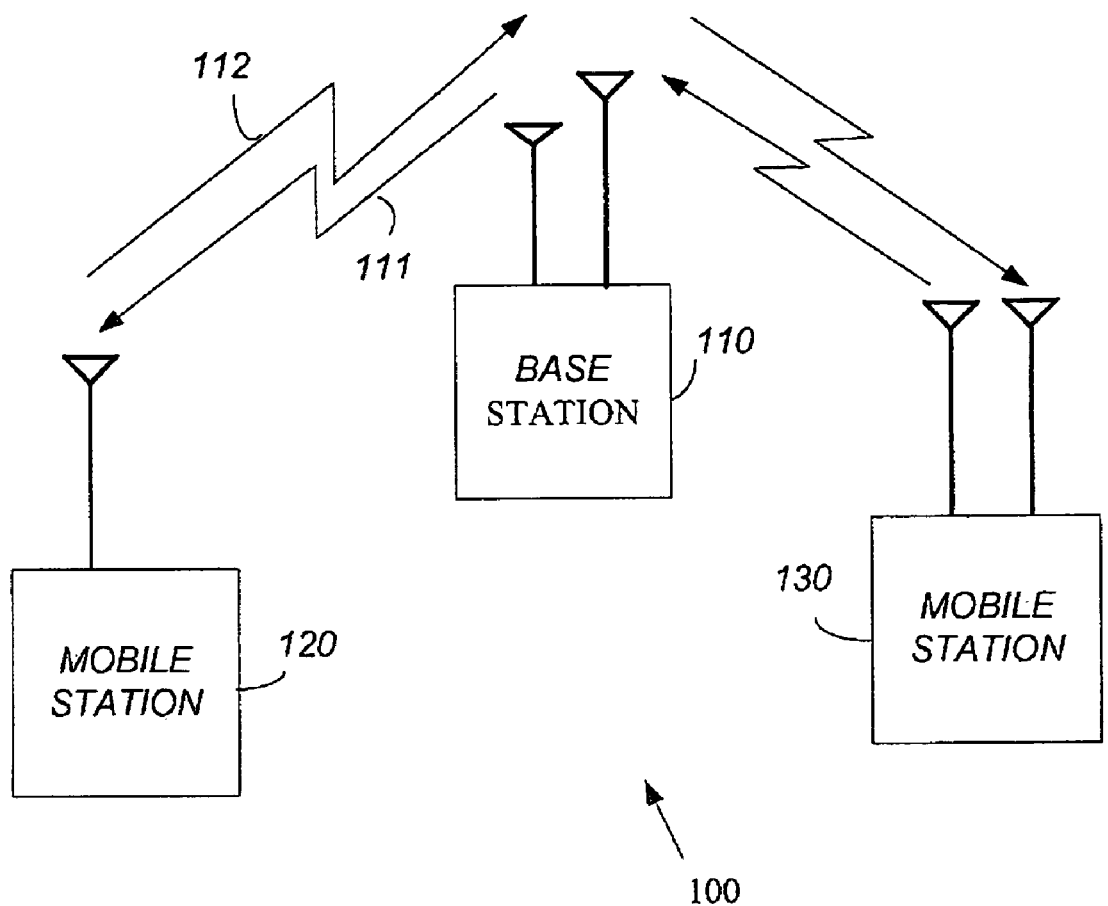
FIG. 1 is a schematic block diagram of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples base stations and mobile stations of a cellular communication system, wireless local area network (WLAN), metropolitan area network (MAN) or the like. Communication devices intended to be included within the scope of the present invention may include, by a way of example only, cellular radiotelephone portable communication devices, digital communication system portable devices, and the like.

Types of cellular radiotelephone systems intended to be within the scope of the present invention include, although are not limited to, Code Division Multiple Access (CDMA) and WCDMA cellular radiotelephone portable devices for transmitting and receiving spread spectrum signals, Global System for Mobile communication (GSM) cellular radiotelephone, General Packet Radio Service (GPRS), Extended GPRS, and the like.

For simplicity, although the scope of the invention is in no way limited in this respect, embodiments of the present that will be described below may be related to a CDMA family of cellular radiotelephone systems that may include CDMA, WCDMA, CDMA 2000, and the like. The term "plurality" may be used throughout the specification to describe two or more components, devices, elements, parameters and the like. For example, "plurality of mobile stations" describes two or more mobile stations. In addition, it should be known to one skilled in the art that the term "a portable communication device" may refer to, but is not limited to, a mobile station, a portable radiotelephone device, a cell-phone, a cellular device, personal computer, Personal Digital Assistant (PDA), user equipment, and the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. Wireless communication system 100 may include a base station 110 and mobile stations 120 and 130.

According to this exemplary embodiment, base station 110 may transmit over a downlink channel 111 modulated radio frequency (RF) signals, if desired. Mobile station 120 may transmit over an uplink channel 112 modulated RF signals to base station 110. According to exemplary embodiments of the invention the modulated RF signals may include, among other signals, pilot signals and transmit power control command signals.

According to an exemplary embodiment of the present invention, communication system 100 may include a WCDMA channel access scheme which may include one or more pilot signals and one or more TPC command signals. The pilot signal may include a predetermined bit sequence, if desired. The TPC command signal may include unknown and/or uncoded bits sequences, although the scope of the present invention is not limited to this exemplary embodiment. Mobile stations 120 and 130 may control, e.g., vary, their transmit power according to the TPC command received from base station 110.

Furthermore, mobile stations 120 and/or 130 may switch their transmitters on and/or off according to a quality indicator of the TPC command. For example, the quality indicator may include an error ratio level, bit error rate (BER) or the like. For example, a first quality threshold level $Q_{out}$ may be used to switch off the transmitter of the mobile station and a second quality threshold level $Q_{in}$ may be used to switch on the transmitter. As a non-limiting example, $Q_{out}$ may have a TPC command error level of 30% and Qin may have a TPC command error level of 20%.

According to embodiments of the present invention, the TPC command error level may be estimated from a received pilot signal. For example, a noise level and an amplitude of one or more samples of the received pilot signal may be estimated to set the quality indicator of the TPC command signal, for example, BER.

Figure 2:
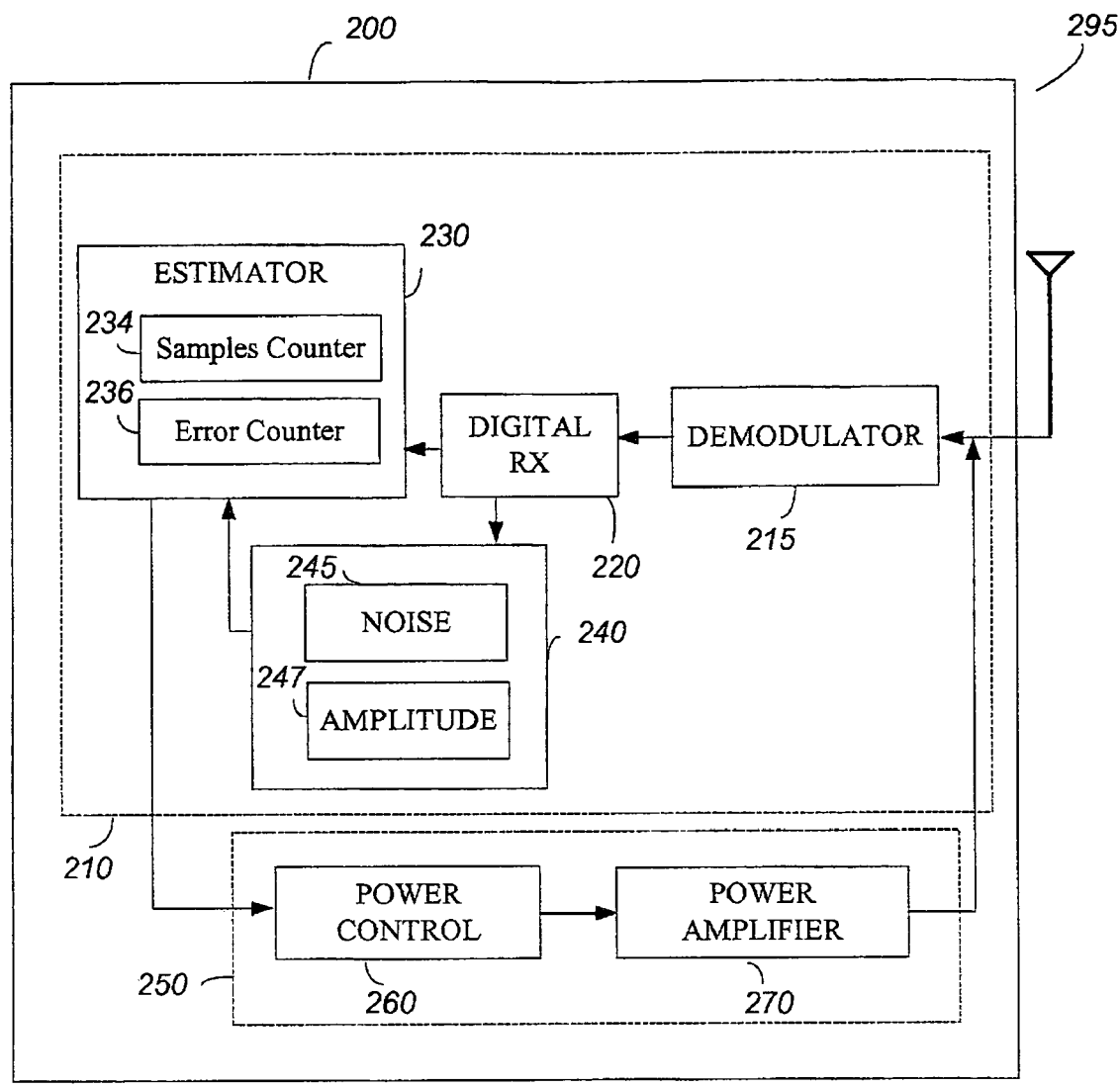
FIG. 2 is a schematic block diagram of a mobile station according to some exemplary embodiments of the invention.

Turning to FIG. 2, a schematic block diagram of a mobile station 200 according to exemplary embodiments of the invention is shown. Mobile station 200 may include, a receiver 210, a transmitter 250 and at least one antenna 295.

Although the scope of the present invention is not limited in this respect, types of antennas that may be used with embodiments of the invention (e.g., antenna 295), may include an internal antenna, a dipole antenna, an omni-directional antenna, a monopole antenna, an end fed antenna, a circularly polarized antenna, a micro-strip antenna, a diversity antenna and the like.

According to embodiments of the present invention, receiver 210 may include a demodulator 215, a digital receiver (RX) 220, an estimator 230, and a memory device 240. Transmitter 250 may include a power control unit 260 and a power amplifier 270.

According to embodiments of the invention, antenna 295 may receive from a base station (e.g., base station 110) a modulated RF signal which may include a pilot signal and a TPC command signal. Demodulator 215 may demodulate the RF signal to provide, at least, the pilot signal and the TPC command signal to digital receiver 220. It should be understood that the pilot signal and the TPC signal may include noise and/or other interferer signals, although the scope of the present invention is not limited in this respect.

According to embodiments of the present invention, digital receiver 220 may include a rake receiver and/or any other type of digital receiver known in the art of wireless communication systems. Digital receiver 220 may sample the pilot signal and the TPC signal. Samples of the pilot signal and TPC signal may be stored in memory 240, if desired. In addition, digital receiver 220 and/or estimator 230 may store in memory 240 values of noise level 245 and amplitude 247 of the pilot signal, if desired.

According to exemplary embodiment of the invention, memory 240 may be a nonvolatile memory device, a volatile memory device, a Flash memory, or the like. More specifically, memory 240 may include, for example, a dynamic read access memory (DRAM), a read only memory (ROM), a Flash memory, a Static RAM (SRAM), or the like.

Although the scope of the present invention is not limited in this respect, estimator 230 may include a samples counter 234 to count the number of samples and an error counter 236 to count the numbers of samples that includes errors. Estimator 230 may receive from memory 240 values of noise level 245 and amplitude 247 of the pilot signal for estimating a quality indicator of TPC, if desired. For example estimator 230 may determine the quality indicator based on a ratio of the number of errors provided by error counter 236 and the number of samples provided by samples counters 234.

In other embodiments of the present invention, estimator 230 may estimate the noise level and the amplitude of the pilot signal from bit sequences of the pilot signal stored in memory 240, if desired. Estimator 230 may control power control unit 260, e.g., to switch power amplifier 270 on and/or off according to desirable threshold values.

Figure 3:
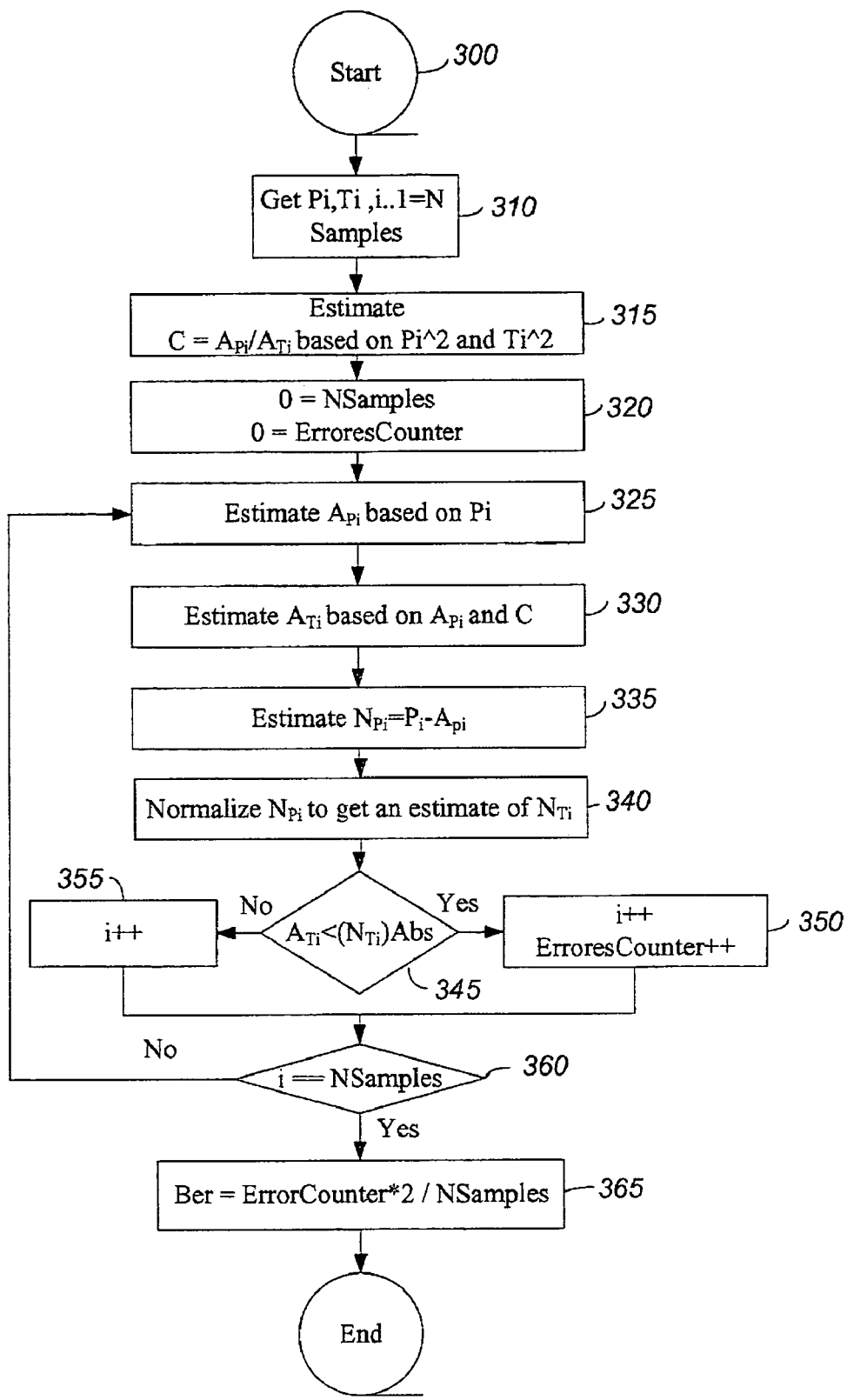
FIG. 3 is a schematic flowchart of a method of estimating a quality parameter of a received power control command according to some exemplary embodiments of the invention.

Turning to FIG. 3, an illustration of a flowchart of a method of estimating a quality parameter of a received power control command according to some exemplary embodiments of the invention is shown. Although the scope of the present invention is not limited in this respect, the method may start (text block 300) by sampling a desired number of samples, i, of a pilot signal, $P_i$, and for a TPC signal, $T_i$, wherein i may be in a range of 1 to N samples, for example N=240. Furthermore, with embodiments of the present invention, $P_i$ and $T_i$ may refer to a bit sequence and/or a symbol sequence of the pilot signal and the TPC signal, respectively (text block 315).

The samples of the pilot sequence $P_i$ and TPC sequence $T_i$ may be stored in nonvolatile and/or volatile memory device (e.g., memory 240). An estimator (e.g., estimator 230) may estimate a quality value of the TPC signal, for example BER, based on an estimated noise level and an estimated amplitude of the pilot signal.

For example, estimator 230 may estimate an amplitudes ratio C according to $C=P_i/A_{Ti}$ based on Pi^2 and Ti^2 (text block 315), wherein $A_{Pi}$ may be an estimated amplitude of the pilot sequence $P_i$ and $A_{Ti}$ may be an estimated amplitude of the TPC sequence Ti. Furthermore, estimator 230 may perform the above described method on samples i=0 to i=N and may count errors using an errors counter. An initiation of samples counter, e.g., Nsamples, and errors counter, e.g., ErrorsCounter (text block 320), may be desired before starting to estimate the quality indicator (e.g., BER) of the TPC sequence. In this exemplary embodiment, the quality indicator may be BER. The BER may be calculated for samples from 0 to N (text block 360) and according to BER=ErrorsCounter/(2*Nsamples) (text block 365).

Although the scope of the present invention is not limited in this respect, estimating $A_{Pi}$ may be done by measuring and averaging the amplitudes of Pi samples (text block 325). Estimating $A_{Ti}$ may be done by multiplying the estimated value of C with the estimated value of $A_{Pi}$ (text block 325). Estimating the noise level of the pilot sequence $N_{Pi}$ may be done by subtracting a sample and/or the sum of samples of the pilot sequence from the estimated amplitude $A_{Pi}$ and/or the sum of estimated amplitudes of samples of the pilot sequence, for example $N_p i=Pi-A_{Pi}$ (text block 355). Estimating the noise level of TPC sequence $N_{Ti}$ may be done by normalizing the estimated noise of the pilot sequence $N_p i$ (text block 340). For example, normalizing the estimated noise level of the pilot sequence $N_p i$ may be done with the following equations:

$$N_{Ti}=N_{Pi}*(\text{NtpcBitsInTpcSample}/\text{NpilotBitsInPilotSample})^{0.5}.$$

If (NtpcBitsInTpcSample=NpilotBitsInPilotSample), then it may be assumed that $N_{Ti}=N_{Pi}$, although the scope of the present invention is not limited in this respect.

According to embodiments of the present invention, an absolute value of the estimated noise level of TPC sequence may be compared to the estimated amplitude of the TPC sequence e.g., $A_{Ti}<\text{Abs}(N_{Ti})$ (text block 360). The errors counter (e.g., ErrorsCounter) may be incremented if the noise level is greater than the amplitude level of the TPC sequence (text block 350). For example, the errors counter may be incremented by ½ (one half) error, if desired While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
  receiving over a downlink channel of a wireless communication system a pilot signal having a predetermined bit sequence and a transmit power control (TPC) command signal having an unknown bit sequence;
  estimating a noise level and an amplitude level of one or more samples of the received pilot signal;
  determining a quality indicator of the transmit power control (TPC) command signal based on said estimated amplitude and said estimated noise level of the pilot signal;
  varying a transmit power level based on the TPC command; and
  switching a transmitter to power on state or power off state based on the quality indicator of said TPC command signal.

2. The method of claim 1, comprising:
  sampling the pilot and transmit power command signals; and
  estimating the amplitude level and a noise level from one or more samples of the pilot signal.

3. The method of claim 2, comprising:
  estimating an amplitude of the TPC command signal based on the amplitude of the pilot signal; and
  estimating a noise level of the TPC command signal based on the noise level of the pilot signal.

4. The method of claim 3, comprising:
  comparing the amplitude of the TPC command signal to the noise level of the TPC command signal; and
  incrementing an error count if the noise level of the transmit power command signal is greater than the amplitude of the transmit power command signal.

5. The method of claim 4, comprising:
  repeating comparing and incrementing the error count for two or more samples of the TPC command signal; and
  determining the quality indicator based on a ratio between the error count and the number of said two or more samples.

6. An apparatus comprising:
  a receiver to receive over a downlink channel of a wireless communication system a pilot signal having a predetermined bit sequence and a transmit power control (TPC) command signal having an unknown bit sequence, wherein a transmit power control (TPC) command is to vary a transmit level of a transmitter;
  an estimator to determine a quality indicator of the transmit power control (TPC) command signal based on an estimated amplitude and a noise level of the pilot signal; and
  a power control unit operably coupled to said transmitter to switch said transmitter to power on state and to power off state based on the quality indicator.

7. The apparatus of claim 6, wherein the estimator is able to sample the pilot signal and the TPC command signal and to estimate the amplitude and the noise level from a sample of the pilot signal.

8. The apparatus of claim 7, wherein the estimator is able to estimate an amplitude of the TPC command signal based on the amplitude of the pilot signal and to estimate a noise level of the TPC command signal based on the noise level of the pilot signal.

9. The apparatus of claim 8, wherein the estimator is able to compare the amplitude of the TPC command signal to the noise level of the TPC command signal and to increment an error counter if the noise level is greater than the amplitude level.

10. The apparatus of claim 9, wherein the estimator is able to repeatedly compare the amplitude and noise levels of the TPC command signal and to increment the error counter for two or more samples of the TPC command signal, and to determine the quality indicator based on a ratio between a number of errors counted by the counter and a number of the two or more samples.

11. A wireless communication device comprising:
  a receiver operably coupled to a dipole antenna to receive over a downlink channel of a wireless communication system a pilot signal having a predetermined bit sequence and a transmit power control (TPC) command signal having an unknown bit sequence, wherein a transmit power control (TPC) command is to vary a transmit level of a transmitter;
  an estimator to determine a quality indicator of the transmit power control (TPC) command signal based on an estimated amplitude and a noise level of the pilot signal; and
  a power control unit operably coupled to said transmitter to switch said transmitter to power on state and to power off state based on the quality indicator.

12. The wireless communication device of claim 11, wherein the estimator is able to sample the pilot signal and the TCP command signal and to estimate the amplitude and the noise level from a sample of pilot signal.

13. The wireless communication device of claim 12, wherein the estimator is able to estimate an amplitude of the TCP command signal based on the amplitude of the pilot signal and to estimate a noise level of the TCP command signal based on the noise level of the pilot signal.

14. The wireless communication device of claim 13, wherein the estimator is able to compare the amplitude of the TCP command signal to the noise level of the TCP command signal and to increment an error counter if the noise level is greater than the amplitude level.

15. The wireless communication device of claim 14, wherein the estimator is able to repeatedly compare the amplitude and noise levels of the TPC command signal and to increment the error counter for two or more samples of the TPC command signal, and to determine the quality indicator based on a ratio between a number of errors counted by the counter and a number of the two or more samples.

16. A wireless communication system comprising:
  a wireless communication device having a receiver to receive over a downlink channel of a wireless communication system a pilot signal having a predetermined bit sequence and transmit power control (TPC) command signal having an unknown bit sequence, wherein a transmit power control (TPC) command is to vary a transmit level of a transmitter,
  an estimator to determine a quality indicator of the transmit power control (TPC) command signal based on an estimated amplitude and a noise level of the pilot signal and
  a power control unit operably coupled to said transmitter to switch said transmitter to power on state and to power off state based on the quality indicator.

17. The wireless communication system of claim 16, wherein the estimator is able to sample the pilot signal and the TPC command signal and to estimate the amplitude and the noise level from a sample of the pilot signal.

18. The wireless communication system of claim 17, wherein the at least one characteristic includes a noise level and an amplitude, and wherein the estimator is able to estimate the noise level and the amplitude from the sample of the pilot signal.

19. The wireless communication system of claim 18, wherein the estimator is able to estimate an amplitude of the TPC command signal based on the amplitude of the pilot signal and to estimate a noise level of the TPC command signal based on the noise level of the pilot signal.

20. The wireless communication system of claim 19, wherein he estimator is able to compare the amplitude of the TPC command signal to the noise level of the TPC command signal and to increment an error counter if the noise level is greater than the amplitude level.

21. The wireless communication system of claim 20, wherein the estimator is able to repeatedly compare the amplitude level and the noise level of the TPC command signal and to increment the error counter for two or more samples of the TPC command signal, and to determine the quality indicator based on a ratio between a number of errors counted by the counter and a number of the two or more samples.

22. An article comprising: a storage medium having stored thereon instructions that when executed result in:
    receiving over a downlink channel of a wireless communication system a pilot signal having a predetermined bit sequence and a transmit power control (TPC) command signal having an unknown bit sequence;
    estimating a noise level and an amplitude level of one or more samples of the received pilot signal;
    determining a quality indicator of the transmit power control (TPC) command signal based on said estimated amplitude and said estimated noise level of the pilot signal;
    varying a transmit power level based on transmit power control (TPC) command; and
    switching a transmitter to power on state or power off state based on the quality indicator of said TPC command signal.

23. The article of claim 22, wherein the instructions when executed result in:
    sampling the pilot signal and the TPC command signal; and
    estimating the an amplitude level and a noise level from one or more samples from a sample of the pilot signal.

24. The article of claim 23, wherein the instructions when executed result in:
    estimating an amplitude of the TPC command signal based on the amplitude of the pilot signal; and
    estimating a noise level of the TPC command signal based on the noise level of the pilot signal.

25. The article of claim 22, wherein the instructions when executed result in:
    comparing the amplitude of the TPC command signal to the noise level of the transmit power command signal; and
    incrementing an error count if the noise level of the TPC command signal is greater than the amplitude of the TPC command signal.

26. The article of claim 25, wherein the instructions when executed result in:
    repeating comparing and incrementing the error count for two or more samples of the TPC command signal; and
    determining the quality indicator based on a ratio between the error count and the number of said two or more samples.

* * * * *

UNITED STATES PATENT AND TRADEMARK OFFICE
CERTIFICATE OF CORRECTION

PATENT NO. : 7,640,034 B2  Page 1 of 1
APPLICATION NO. : 11/314024
DATED : December 29, 2009
INVENTOR(S) : Niv Bomash It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Twenty-first Day of December, 2010

David J. Kappos
*Director of the United States Patent and Trademark Office*